United States Patent [19]

Heller

[11] 4,085,867
[45] Apr. 25, 1978

[54] DISPENSING CONTAINERS AND HOLDER

[76] Inventor: Peter Van Nest Heller, 213 Esplanade, San Clemente, Calif. 92672

[21] Appl. No.: 708,373

[22] Filed: Jul. 26, 1976

[51] Int. Cl.² .............................................. B67D 3/00
[52] U.S. Cl. .................................... 222/181; 222/207; 248/215
[58] Field of Search ...................... 222/105, 143, 179.5, 222/181, 180, 207, 481, 214, 215; 248/214, 215, 222.2

[56] References Cited

U.S. PATENT DOCUMENTS

| | | | |
|---|---|---|---|
| 1,326,880 | 12/1919 | Rose | 222/207 |
| 1,542,584 | 6/1925 | Rose | 222/207 |
| 2,283,463 | 5/1942 | Rupp | 222/494 X |
| 2,570,454 | 9/1951 | Jervis | 248/222.2 X |
| 2,816,695 | 12/1957 | Dagenais | 222/481 |
| 2,868,417 | 1/1959 | Legman | 222/180 |
| 2,965,268 | 12/1960 | Bauerlein | 222/207 X |
| 3,078,016 | 2/1963 | Judy | 222/181 |
| 3,338,475 | 8/1967 | Englesson | 222/207 X |
| 3,628,700 | 12/1971 | Dodoghue | 222/207 |
| 3,704,675 | 12/1972 | Bellasalma | 248/222.2 X |

FOREIGN PATENT DOCUMENTS 597,860   5/1934   Germany .............................. 222/105

*Primary Examiner*—Joseph F. Peters, Jr.
*Assistant Examiner*—Norman L. Stack, Jr.
*Attorney, Agent, or Firm*—Ralph B. Pastoriza

[57] ABSTRACT

The dispensing container defines a main chamber and integrally formed pump chamber beneath the main chamber. A first check valve is positioned between the main chamber and pump chamber within the container and a second combination pressure relief and check valve is provided at the lower end of the pump chamber. The walls of the pump chamber are flexible and may be manually squeezed to dispense liquid in the pump chamber through the second check valve, releasing of the walls then drawing more liquid from the main chamber into the pump chamber. The dispenser container design is such that a plurality of such containers can be conveniently coupled to a track in horizontal, side-by-side relationship for mounting on a bathroom wall.

6 Claims, 7 Drawing Figures

U.S. Patent  April 25, 1978  4,085,867
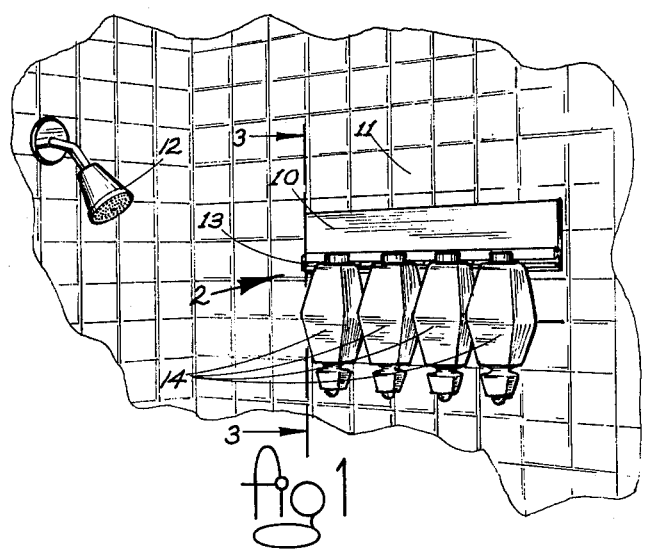
fig 1
fig 2
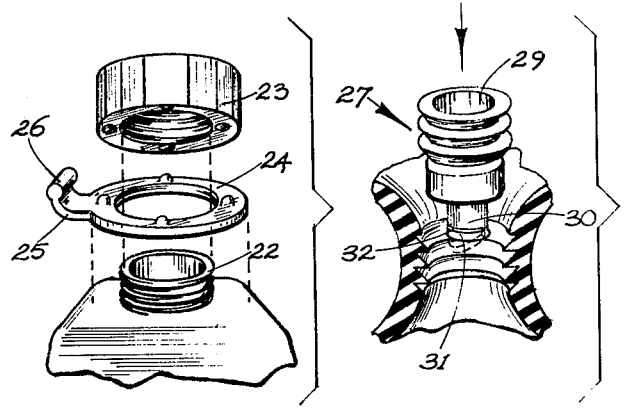
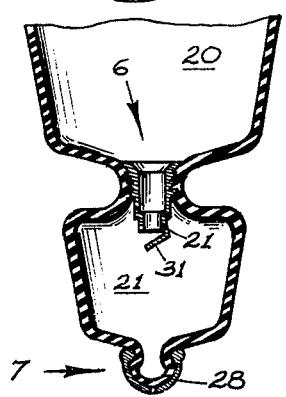
fig 3
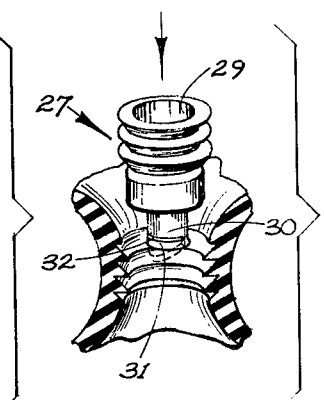
fig 4
fig 6
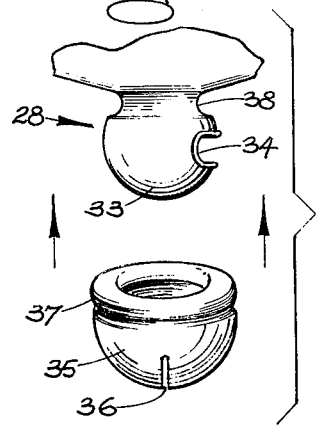
fig 5
fig 7

DISPENSING CONTAINERS AND HOLDER

This invention relates generally to dispensing containers and more particularly to multi-viscosity dispensing containers and a cooperating holder for liquid shampoo and the like.

BACKGROUND OF THE INVENTION

Presently available dispensing containers for hand cream, shampoo, and the like have generally been of two types. First, a simple invert and squeeze type flexible plastic container serves to dispense the contained liquid from the top end. The second type includes a piston pump in the neck portion of the container to force the liquid out of a spout. In the latter arrangement, reliance is had on atmostpheric pressure to raise the displaced liquid to the pump chamber through a check valve.

The invert and squeeze type dispenser containers require increasingly larger and more forceful squeezing action to deliver a uniform portion of the dispensed liquid volume as the dispensed liquid is replaced by air. The replacement air itself must be drawn into the spout between the several repeated dispensings, thus causing delay, spitting, clogging and other disadvantages.

The piston pump types in turn require a check valve which frequently leaks and allows the pump to lose its prime. The operator must therefore resort to multiple pump strokes to re-establish dispensing pump action. Further, the piston pump type containers are generally more expensive to manufacture then a simple squeeze type.

Where such prior art containers are used for dispensing a liquid shampoo normally used in taking showers, the containers themselves are sometimes placed on the shower floor in a corner or if the shower is so constructed on a foot shelf. They are thus not readily available particularly when a person is in the process of shampooing and might have soap in his or her eyes. It has been proposed to provide corner brackets or wall mounts which will support a dispensing container for shampoo but these mounts are such that the container itself cannot be easily removed for replacement or use elsewhere.

The foregoing situation is further aggravated when different viscosity liquids are used since separate dispensing bottles are normally required for each type of liquid; one, for example, for the shampoo and another, for example, for a hair rinse. The shower floor thus becomes strewn with bottles and can become a safety hazard.

BRIEF DESCRIPTION OF THE PRESENT INVENTION

With all of the foregoing in mind, the present invention contemplates the provision of a vastly improved dispensing container particularly useful for liquid shampoo and the like and which may be economically manufactured and yet avoid the disadvantages associated with invert and squeeze type bottles and the conventional piston pump types. Further, the invention contemplates in combination with the dispensing container a simple holder or mounting means capable of holding a plurality of identically constructed containers in side-by-side relationship on a shower wall or other convenient location in the bathroom, the mounting being such that the dispensing containers may be easily removed for replacement or use elsewhere.

Briefly, the invention includes an elongated flat strip having securing means on its rear surface for fastening the strip to a bathroom wall and defining on its front surface a horizontally extending track means. A plurality of containers are provided with cooperating means receivable in the track means for holding the containers on the strip in side-by-side relationship such that the containers may be slid or detached from the track means for easy removal and use in other bathrooms or for replacement. Attachment and removal of the container can be by either hanging, for frequently removed containers, or by a more permanent attachment by simply inverting the hanger means. This more permanent attachment would be preferred for mobile installations.

Each container itself defines a main chamber and smaller pump chamber integrally formed beneath the main chamber. A first check valve is disposed interior of the container between the main chamber and pump chamber to pass liquid from the main chamber to the pump chamber and block passage of liquid in a reverse direction so that the pump chamber is always filled with liquid. A second combination pressure relief and check valve means in turn is disposed at the lower end of the pump chamber, the pump chamber itself having flexible walls which may be manually squeezed to dispense the liquid therein. Release of the walls permits them to return to their initial positions, thereby drawing in more liquid from the main chamber to the pump chamber.

With the foregoing arrangement, a uniform quantity of liquid will always be available for dispensing in the pump chamber. Further, the check valves are so constructed that different viscosity liquids can easily be used in the container, each container having a large upper threaded neck opening and screw cap for receiving any desired type of liquid.

The overall design is such that the containers can be manufactured extremely economically, there being required no complicated relatively movable parts which often times become separated.

BRIEF DESCRIPTION OF THE DRAWINGS

A better understanding of this invention as well as further features and advantages thereof will be had by referring to the accompanying drawings in which:

FIG. 1 is a fragmentary perspective view of a portion of a shower illustrating the multi-viscosity dispensing containers and holder of the present invention;

FIG. 2 is an enlarged fragmentary perspective view of a portion of the holder taken in the direction of the arrow 2 of FIG. 1;

FIG. 3 is a side elevational view looking in the direction of the arrows 3—3 of FIG. 1;

FIG. 4 is an exploded perspective view of a portion of the cap structure of the container of FIG. 3;

FIG. 5 is a fragmentary cross section taken in the direction of the arrows 5—5 of FIG. 3;

FIG. 6 is an exploded perspective view of a check valve means incorporated in the container of FIG. 3 looking in the direction of the arrow 6 of FIG. 5; and FIG. 7 is a fragmentary exploded view of a combination pressure relief and check valve means looking in the direction of the arrow 7 of FIG. 5.

DETAILED DESCRIPTION OF THE PREFERRED EMBODIMENT

Referring first to FIG. 1 the invention includes an elongated flat strip 10 arranged to be secured to a bathroom wall such as a shower stall wall 11 preferably adjacent to the wall containing the shower head 12 for convenience.

As shown, the strip 10 defines on its front surface a horizontally extending track means designated generally at 13 for supporting a plurality of identically constructed containers 14 in side-by-side relationship.

Referring to the enlarged fragmentary view of the strip 10 and track means 13 shown in FIG. 2, one type of securing or fastening means for the strip may take the form of pressure responsive adhesive material 15 on the rear face of the strip 10.

Referring now to the lower front portion of the strip 10 as shown in FIG. 2, the track means is defined by an elongated horizontal channel 16 facing forwardly with an undercut 17 in its upper wall. In the preferred embodiment set forth, the upper wall further includes an upturned lip 18 defining a horizontally extending trough 19. The purpose for this construction will become clearer as the description proceeds.

Referring now to FIG. 3, each of the containers 14 described in FIG. 1 defines a main chamber 20 and a smaller pump chamber 21 integrally formed beneath the main chamber. As shown, the top of the main chamber has a threaded neck 22 defining a fill opening and a threaded cap 23 receivable over the neck. A means is provided cooperating with the various containers receivable in the track means described in FIGS. 1 and 2 for holding the containers in the referred to side-by-side relationship.

This means is illustrated in FIG. 3 at 24 held to the top of the container by the cap 23 and coupled to the track 13 as shown.

With specific reference to the exploded view of FIG. 4, the cooperating means takes the form of a washer shaped member having an integral laterally extending flange 25 terminating in an upturned bead portion 26. From FIG. 4, it will be evident that the washer shaped member 24 can readily surround and receive through its center opening the threaded neck 22, the cap 23 then threading on the neck 22 to clamp the member 24 in place.

Referring back to FIG. 3, it will be noted that the upturned bead portion 26 of the member 24 is received in the undercut portion 17 of the channel 16 described in FIG. 2. The arrangement is such that the entire container 14 may swing away from the wall, the same pivoting about the bead portion 26 within the channel of the track means 13. If the container is swung ninety degrees from the wall it can be removed from the track.

The pump chamber 21 shown in FIG. 3 has flexible walls which can be manually squeezed towards each other as indicated by the dashed lines at 21' and the arrows, this manual squeezing being readily carried out by swinging the container away from the wall as described by the dotted line position 14'. The manner in which fluid is expressed from the pump chamber 21 in response to this squeezing action will become evident by referring to the fragmentary cross section of FIG. 5.

In FIG. 5, the main chamber 20 and its integral connections with the pump chamber 21 is clearly illustrated, the connecting portions having a narrowed area. A first check valve means 27 is frictionally retained in this narrowed area between the main chamber 20 and pump chamber 21 and serves to pass liquid from the main chamber to the pump chamber but block the flow of liquid in a reverse direction.

At the lower end of the pump chamber 21 there is provided a combination pressure relief and second check valve means 28 which serves to pass liquid from the pump chamber 21 to the exterior of the container in response to the squeezing of the walls as described in conjunction with FIG. 3. Details of the first and second check valves 27 and 28 of FIG. 5 will now be described in conjunction with FIGS. 6 and 7.

Referring first to FIG. 6, the check valve 27 is shown exploded upwardly slightly from the narrowed portion of the container between the main chamber 20 and pump chamber 21. This first check valve comprises a resilient cup shaped member 29 having a lower cylindrical section 30 with a closed end 31 and a circumferential slit 32 in one side. This circumferential slit permits the closed end 31 to flex downwardly under pressure of liquid in the cup thereby functioning as a flap type check valve. In this respect, the entire cup shaped member 29 is frictionally retained in the narrowed portion by appropriate annular serrations as illustrated. Any other suitable adhesive or welded retaining means may be provided, the cup shaped member being oriented with its open cup facing upwardly towards the main chamber 20.

Referring now to FIG. 7, the second check valve means is defined by a lower nipple 33 integrally formed as a lower part of the pump chamber 21 described in FIG. 5. Nipple 33 includes a lateral raised lipped opening 34 communicating with the lower end of the pump chamber. A thin elastic hemispherical shaped covering 35 has a bottom slit 36 and an upper annular peripheral bead 37, the covering being stretchable over the nipple 33 as that the bead 37 snaps into and is retained within an annular groove 38 at the upper portion of the nipple 33.

With the foregoing arrangement, the thin elastic hemispherical shaped covering 35 functions as a combination pressure relief and check valve, the same being unseated by expulsion of liquid from the raised lipped opening 34, this liquid working around to the lower outlet slit 36 when the stretchable member 35 is in place about the nipple 33. The smooth nipple tip allows the tip to be pressed into the hair against the scalp without discomfort.

The foregoing arrangement avoids spattering or any type of uncontrolled flow of liquid from the pump chamber when the walls are squeezed together.

From all of the foregoing, it will be evident that each of the containers comprises essentially only five components when utilized with the strip 10 as a holder arrangement. First, the main chamber 20 and pump chamber 21 together with the lower nipple portion which are all integrally formed of flexible plastic material. Second, the first check valve 27 which is force fitted in the narrow constricted area between the main chamber 20 and pump chamber 21 as described in FIGS. 5 and 6. Third, the combination pressure relief and check valve in the form of the stretchable elastic member 35 which need only be stretched about the nipple portion 33. Fourth, the screw cap 23 for threaded engagement with the threaded neck 22 forming part of the container. Fifth, the cooperating washer shaped member 24 sandwiched between the cap 23 and upper portion of the main chamber 20 of the container for cooperation with the track means 13 on the strip 10.

Each of these parts can be individually molded by high speed mass production techniques. Because of the flap type check valve employed, different viscosity liquids can be used in each of the containers and there are not required any movable pistons or piston type pumps as in the conventional arrangement.

Moreover, the pump chamber 21 will remain a consistent volume provided manual pressure is not applied to the opposing walls and normally will always be filled with liquid from the main chamber. Thus, assuming that uniform squeezing is effected by the user, a consistent volume of liquid will be dispensed each time regardless of the amount of liquid in the main chamber until such time as the remaining portion of liquid in the main chamber is of a volume less than that which can be held in the pump chamber.

OPERATION

The overall operation of this invention will be evident from the foregoing.

Initially, the strip 10 as described in FIGS. 1 and 2 can readily be secured at a convenient location on a bathroom wall. One or more of the containers with their cooperating members such as 24 described in FIG. 3 can then be hung, slid or locked onto the horizontal track 10 so as to assume convenient side-by-side relationships such as indicated in FIG. 1. One container might contain shampoo, another hair rinse, another body soap, a skin conditioner, etc.

Because of the described supporting arrangement by means of the track, any one of the containers can be easily removed by swinging or sliding the same from the track and utilized in another bathroom or replaced by a filled container. Moreover, because of the bead structure described in FIGS. 3 and 4, whenever it is desired to express liquid from one of the containers, it is simply grasped by the lower end in the area of the pump chamber 21 and may be pulled forwardly slightly as indicated by the dashed lines in FIG. 3, the opposing walls of the pump chamber then being squeezed to expel liquid in the chamber directly into the user's hand. Only one hand is required in this dispensing operation for both actuating the expressing of the liquid and receiving the liquid in the same hand.

With particular reference to FIG. 5, it will be understood that when the opposing walls of the pump chamber 21 are squeezed towards each other, the liquid therein will be forced out the combination pressure relief and check valve arrangement 28 to the exterior, this liquid being blocked from flowing back into the main chamber 20 by the first check valve 27, the closed end 31 being pressed closed by the increased pressure in the pump chamber.

On the other hand, when the opposing walls are released, they will return to their initial positions thus drawing in more liquid from the main chamber 20 through the check valve 27 because of the pressure differential created. The second combination pressure relief and check valve 28 in turn will be closed by elastic and exterior atmospheric pressure there-against when the walls of the pump chamber resume their normal positions to draw in the liquid from the main chamber.

When any one or more of the containers is low on liquid it is very easy to refill the same by simply unthreading the cap 23. The cap 23 is preferably locked with the hanger 24 to permit air to enter the main chamber 20 when liquid is drawn therefrom into the pump chamber. On the other hand, if it is desired to transport the container to another bathroom or when the same is shipped when filled with liquid, the cap 23 is threaded tightly onto the neck without the hanger 24 to seal the fill opening. Also, of course, during shipment, a tear off seal would be provided about the lower nipple and check valve member to avoid any accidental expressing of liquid until such time as the container is to be used.

From all of the foregoing, it will thus be evident that the present invention has provided a superior multi-viscosity dispensing container together with a cooperating holding arrangement greatly facilitating the use of the same as a single container or the use of a plurality of such containers.

What is claimed is:

1. Dispensing containers and holder for liquid shampoo and the like, comprising, in combination:
   (a) an elongated flat strip having securing means on its rear surface for fastening the strip to a bathroom wall and defining on its front surface a horizontally extending track means:
   (b) a plurality of identically constructed containers, each having a main chamber and smaller pump chamber integrally formed beneath the main chamber, the top of the main chamber having a threaded neck defining a fill opening and a threaded cap receivable over said neck; and
   (c) a washer shaped member with detent projections on the washer faces receivable over said threaded neck for securement to the container by said cap with cooperating detent depressions and including an integral laterally extending flange terminating in an upturned bead portion, said track means defining a channel facing forwardly with an undercut in its upper wall for receiving said upturned bead portion to thereby support the container in any set horizontal position along said channel so that said containers may be held on said strip in side-by-side relationship and whereby said containers may be hung, swung or slid from said track means for easy removal and use in other bathrooms or for replacement.

2. The subject matter of claim 1, in which the upper wall of said channel defining said track means further includes an upturned lip defining a horizontally extending trough such that said washer shaped member can be turned over and its bead portion received in said trough so that the container hangs solely from said track means.

3. Dispensing containers and holder for liquid shampoo and the like, comprising, in combination:
   an elongated flat strip having securing means on its rear surface for fastening the strip to a bathroom wall and defining on its front surface a horizontally extending track means; a plurality of identically constructed containers; and, means cooperating with said containers receivable in said track means for holding said containers on said strip in side-by-side relationship whereby said containers may be hung, swung or slid from said track means for easy removal and use in other bathrooms or for replacement, each of said containers defining a main chamber and smaller pump chamber integrally formed beneath the main chamber; a first check valve means between said main chamber and pump chamber for passing liquid from said main chamber to said pump chamber and blocking liquid from passing in an opposite direction; and a second combination pressure relief and check valve means at the lower end of said pump chamber for passing liquid from said pump chamber to the exterior of said container, the portion of said container defining said pump chamber having flexible walls which may be manually squeezed towards each other to expel fluid through said second check valve means, said walls returning to their initial positions when the squeezing pressure is released to thereby draw in more liquid from said main chamber to said pump chamber by way of said first check valve means, said second check valve means including a lower nipple shaped member having a raised lipped lateral opening communicating with the lower end of said pump chamber; and a thin elastic hemispherical shaped covering having a bottom slit and attachable over said nipple, said rubber functioning as a combination diaphragm type pressure relief and check valve.

4. The subject matter of claim 3, in which said first check valve means includes a cup shaped member having a lower cylindrical section with a closed end and a circumferential slit in one side permitting the closed end to flex downwardly under pressure of liquid in said cup thereby functioning as a flap type check valve, said container having a narrowed area between the main chamber and pump chamber, said cup shaped member being frictionally received and held in said narrowed area with the open top of the cup portion facing said main chamber.

5. A multi-viscosity dispensing container including:
(a) a main chamber and smaller pump chamber integrally formed beneath the main chamber, the top of the main chamber having a fill opening means for receiving liquid;
(b) a first check valve internally positioned in said container between said main chamber and said pump chamber for passing liquid from said main chamber to said pump chamber and blocking this flow of liquid in an opposite direction; and,
(c) a second combination pressure relief and check valve between the lower end of said pump chamber and the exterior of said container for passing liquid in said pump chamber to the exterior of said container, said second combination pressure relief and check valve including a lower nipple shaped member having a raised lipped lateral opening communicating with the lower end of said pump chamber; and a thin elastic hemispherical shaped covering having a bottom slit and stretchable over said nipple, said rubber functioning as a combination diaphragm type pressure relief and check valve, the walls of said pump chamber being flexible so that they can be manually squeezed to express liquid from said pump chamber through said second combination pressure relief and check valve, releasing of the walls permitting them to return to their initial positions, thereby drawing more liquid into said pump chamber from said main chamber by way of said first check valve.

6. The subject matter of claim 5, in which said fill opening means is defined by a threaded neck; and a threaded cap receivable on said neck and adapted to be partially threaded in a manner to permit air to pass by said cap into said main chamber to replace liquid removed therefrom, complete threading of said cap on said threaded neck sealing said fill opening means.

* * * * *